(No Model.)
Z. S. & M. C. RANDLEMAN.
HAY AND FODDER FORK.
No. 384,281. Patented June 12, 1888.
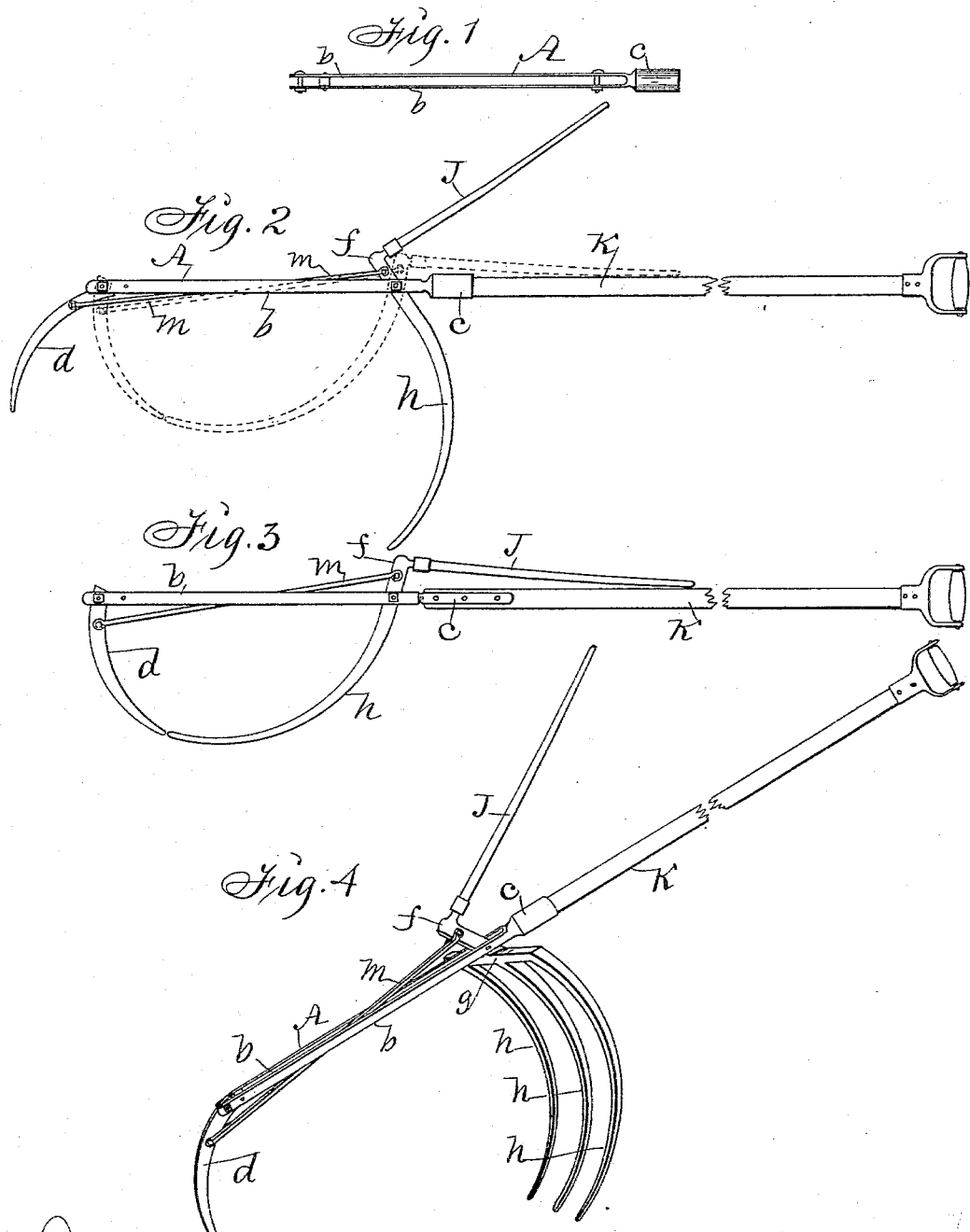

UNITED STATES PATENT OFFICE.

ZOUAVE S. RANDLEMAN AND MARTIN C. RANDLEMAN, OF CARLISLE, IOWA.

HAY AND FODDER FORK.

SPECIFICATION forming part of Letters Patent No. 384,281, dated June 12, 1888.

Application filed January 16, 1888. Serial No. 260,803. (No model.)

*To all whom it may concern:*

Be it known that we, ZOUAVE S. RANDLEMAN and MARTIN C. RANDLEMAN, citizens of the United States of America, and residents of Carlisle, in the county of Warren and State of Iowa, have invented a new and useful Fork for Handling Corn-Fodder, Hay, &c., of which the following is a specification.

Heretofore tines have been fixed to the lower or front end of a handle in such a manner that that they would project forward, so that they could be thrust into hay and other material, and a second series of pivoted tines or a clasp then pressed forward upon the matter to clamp it fast upon the forwardly-projecting fixed tines thrust through or under the matter.

Our object is to provide a hand-fork that can be thrust into a heap or shock of corn-fodder, and the forwardly-projecting tine then swung backward to serve as a hook to pull backward and to separate some of the fodder from the mass, while at the same time hinged tines are swung forward to engage and clasp the fodder thus separated and hold it securely, so it can be handled, carried, and tossed as readily as hay is moved about by means of a hand-fork. There is no hand-fork known that is well adapted to be used for handling such slippery farm product, and our object is to avoid the disagreeable labor of applying the hands direct to such matter, and to provide a fork that can be readily operated by a person for seizing and lifting and moving unbound fodder, hay, and analogous products that must be handled.

Our invention consists in the construction and operation of the fork hereinafter set forth, pointed out in our claims, and illustrated in the accompanying drawings, in which—

Figure 1 is a top view of the metal portion of our fork-handle. Fig. 2 is a side view showing the complete fork in an open position, as required to be when thrust into a mass of corn-fodder in a shock, heap, or stack. Fig. 3 shows it in a closed position, as required to retain fodder or other products seized thereby. Fig. 4 is a perspective view showing clearly the construction and combination of the different parts.

A is a bifurcated section of the handle, about fifteen inches long, made complete in one piece of malleable iron, or forged out of wrought metal, in such a manner that operative tines can be pivoted to the two parallel bars $b\ b$ and a wooden handle fixed to their united ends or sockets $c$.

$d$ is a curved metal tine or lever of the third order, pivoted between the free ends of the bars $b$ by means of a rivet or bolt.

$f$ is a lever of the first order, pivoted near the united ends of the bars $b$. It has a T end or head, $g$, from which project two or more curved tines, $h$.

J is an arm fixed to the end of the lever $f$ in such a manner that it will extend at right angles therefrom and parallel with the wooden handle $k$ when the pivoted parts are closed upon a bunch of fodder that is to be handled.

$m$ is a connecting-rod that extends from the tine and lever $d$ to the lever $f$ in such a manner that whenever power is applied to the long arm J of the lever $f$ the two levers will be jointly operated.

To prepare the fork to seize fodder therewith, the arm J is turned outward and at right angles to the handle K, to thereby move the tines $d$ and $h$ in opposite directions, so that the tine $d$ will project forward and in proper position to be thrust into a mass of fodder in a shock, on a wagon, or in a barn. After the pointed tine is forced into the material, a reverse motion of the arm J will cause the tines $d$ and $h$ to swing toward each other and to clasp all the material between them, so that it can be readily lifted and carried and tossed by means of the fork, as required to handle such material, without the direct application of the hands.

We claim as our invention—

1. A fork for handling corn-fodder, comprising a long straight handle having a tine hinged to its lower end, an elbow-shaped lever pivoted to the same handle at some distance from the pivoted tine, two or more tines fixed to the said lever, and a rod connecting the single tine at the end of the handle with the elbow-shaped lever, arranged and combined to operate in the manner set forth.

2. The metal handle A, having a socket, $c$, adapted to receive a wooden handle, a pivoted tine, $d$, a lever, $f$, having a cross-head, $g$, and two or more parallel tines, $h$, projecting from said cross-head, an arm, J, and a rod, $m$, constructed and combined substantially as shown and described, for the purposes stated.

ZOUAVE S. RANDLEMAN.
MARTIN C. RANDLEMAN.

Witnesses:
MARTIN P. SMITH,
THOMAS G. ORWIG.